Dec. 31, 1963 R. B. DOME 3,116,373

BRIDGED-T TIME DELAY NETWORK

Filed Sept. 7, 1962

INVENTOR:
ROBERT B. DOME,

BY Joseph Levinson
HIS ATTORNEY.

United States Patent Office 3,116,373
Patented Dec. 31, 1963

3,116,373

BRIDGED-T TIME DELAY NETWORK

Robert B. Dome, Geddes Township, Onondaga County, N.Y., assignor to General Electric Company, a corporation of New York Filed Sept. 7, 1962, Ser. No. 222,121
3 Claims. (Cl. 179—15)

This invention relates to a bridged-T network that may be used for matching the time delays in two separate channels of communication systems, as for example, in stereo systems.

Bridged-T networks which are known in the prior art are terminated in a resistor which is equal to the generator resistance. Since the use of the terminating resistor produces an output voltage which is one-half of the source voltage, it is desirable to dispense with this type of termination if possible.

It is an object of this invention to provide a bridged-T network which is not terminated in its characteristic impedance.

In stereophonic communication systems, for example, of the type shown and described in applicant's application Serial No. 150,562, it may be necessary to provide matching time delays in two separate channels where equal time delays are required over only a lower portion of a frequency band, but where equal delays are not required over a higher portion of the frequency band. The use of transmission lines for such a purpose would be too expensive. Low pass filters might also be used but several would probably be required to pass the frequency band utilized, and in addition it may be difficult to match the time delays accurately over the lower portion of the band.

Accordingly, it is a further object of this invention to provide a bridged-T network which provides a constant amplitude voltage over a desired frequency band and at the same time provides the necessary delay inexpensively.

Another object of this invention is to provide a bridged-T network which is not terminated in its characteristic impedance but which provides a desired time delay along with a constant amplitude over the frequency band desired.

In carrying out this invention in one illustrative embodiment thereof, a bridged-T, all pass network is provided which is not terminated in a resistor which is equal to the resistance of the generator applied to the input of the bridged-T circuit. This network is modified by proper selection of circuit parameters to provide a matching time delay over a given frequency band and an output voltage which remains constant with respect to the input voltage over the desired band of frequencies.

Figure 1:
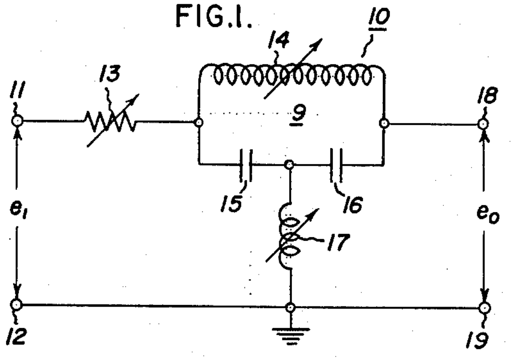
Figure 2:
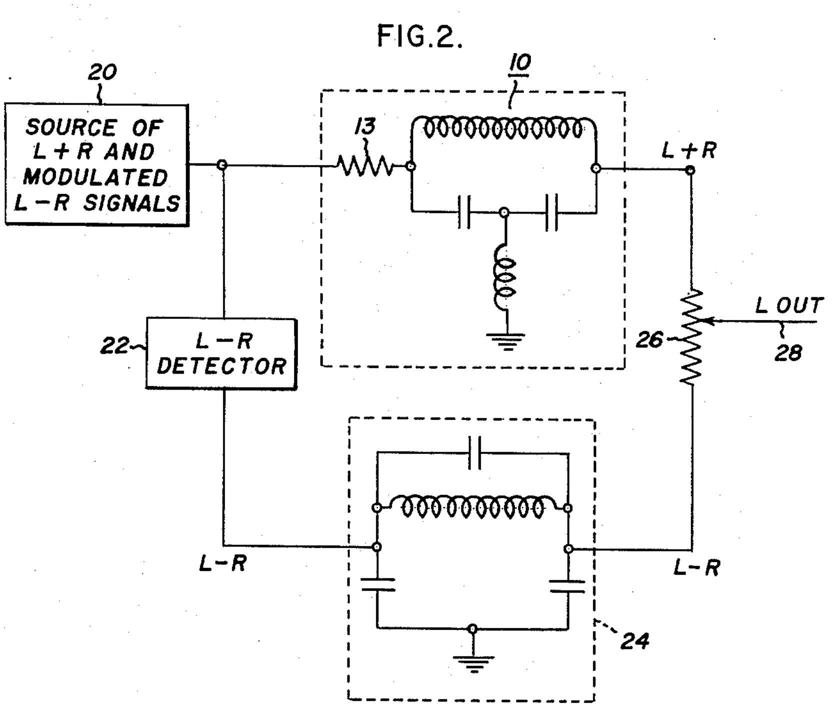

The invention, both as to organization and method of operation, together with further objects and advantages thereof, may best be understood by reference to the following description taken in connection with the accompanying drawings, in which:

FIGURE 1 is a schematic diagram of a bridged-T network embodied in this invention, and FIGURE 2 is a schematic diagram of the bridged-T network of FIGURE 1 as applied in one type of stereophonic communications system.

Referring now to FIGURE 1, there is shown a bridged-T network designated with the character reference 10. The network 10 has a pair of input terminals 11 and 12 to which a voltage source $e_1$ is applied. The voltage source $e_1$ has an internal resistance indicated by a resistor 13 connected to the terminal 11. A parallel resonant circuit 9 comprising an inductor 14 connected across a pair of serially connected capacitors 15 and 16 is connected between the resistor 13 and an output terminal 18. An inductor 17 is connected between the junction of capacitors 15 and 16 and to a point of common reference potential shown as ground. An output voltage $e_0$ appears across a pair of output terminals 18 and 19.

In accordance with my invention, capacitors 15 and 16 are made equal to each other, and the parallel resonant circuit 9 is adjusted so that it resonates at a frequency $f_0$ as determined by the equation $$f_0=\frac{1}{2\pi\sqrt{L_{14}C_1}} \quad (1)$$

where $L_{14}$ is the inductance 14 and $C_1$ is the effective capacitance of the series combination of capacitors 15 and 16.

The inductance 17 is made equal to one fourth of the inductance 14 so that it resonates at $f_0$ as determined by the equation $$f_0=\frac{1}{2\pi\sqrt{L_{17}C_2}} \quad (2)$$

where $L_{17}$ is the inductance 17 and $C_2$ is the effective capacitance of the parallel combination of capacitors 15 and 16.

When the reactive elements of the circuit 10 are adjusted in accordance with Equations 1 and 2, the phase shift of the voltage $e_0$ with respect to $e_1$ at the resonant frequency $f_0$ is independent of the value of the resistor 13 and is 180°, or $\pi$ radians. The time delay $\tau_1$ at $f_0$ therefore is the angle at $f_0$ divided by $2\pi f_0$, or $$\tau_1=\frac{\phi}{2\pi f_0}=\frac{\pi}{2\pi f_0}=\frac{1}{2f_0} \quad (3)$$

The resistor 13 may now be varied to adjust the network 10 to provide for uniform amplitude of $e_0$ with respect to $e_1$ over the desired frequency band without disturbing the time delay $\tau_1$.

The adjustment procedure for tuning the bridged-T network would be to open the connection of inductor 17 to ground and adjust the inductance of inductor 14 until the output is zero at $f_0$. Then reconnect inductor 17 to ground and short out inductor 14 and adjust inductor 17 until the output is zero at $f_0$. Lastly, with the above adjustments completed and the circuit reconnected as in FIGURE 1, the resistor 13 is adjusted until the response is flat in amplitude over the range from zero frequency to frequency $f_0$.

It has been experimentally found in accordance with adjustment procedures that a uniform amplitude and time delay can be obtained with the relationships of elements as follows:

$$R_{13}=\alpha\sqrt{\frac{L_{14}}{C_1}} \quad (4)$$

where $C_1$=one-half capacitor 15 or one-half of capacitor 16 and $$\tfrac{1}{3}<\alpha<1 \quad (5)$$

and $$L_{17}=\frac{L_{14}}{4} \quad (6)$$

The mathematical relationship between $e_0$ and $e_1$ in network 10 has been solved for and is $$\frac{e_0}{e_1}=\frac{\omega^4L_{14}^2C_1^2-\omega^2L_{14}C_1+1}{\omega^4L_{14}^2C_1^2-3\omega^2L_{14}C_1+1+j4\omega C_1R_{13}(1-\omega^2L_{14}C_1)} \quad (7)$$

This equation may be simplified by making use of Equation 1 solved for $L_{14}C_1$. From Equation 1, $$L_{14}C_1=\frac{1}{4\pi^2f_0^2}=\frac{1}{\omega_0^2} \quad (8)$$

Substituting Equation 8 into Equation 7, $$\frac{e_0}{e_1}=\frac{\frac{\omega^4}{\omega_0^4}-\frac{\omega^2}{\omega_0^2}+1}{\frac{\omega^4}{\omega_0^4}-3\frac{\omega^2}{\omega_0^2}+1+j4\omega C_1R_{13}\left(1-\frac{\omega^2}{\omega_0^2}\right)} \quad (9)$$

Equation 9 may be further simplified by substituting for $R_{13}$ its value as given by Equation 4. The factor $4\omega C_1R_{13}$ in Equation 9 then becomes $$4\omega C_1R_{13}=4\omega C_1\alpha\sqrt{\frac{L_{14}}{C_1}}=4\omega\alpha\sqrt{L_{14}C_1}=\frac{4\omega\alpha}{\omega_0} \quad (10)$$

Substituting Equation 10 into Equation 9, $$\frac{e_0}{e_1}=\frac{\frac{\omega^4}{\omega_0^4}-\frac{\omega^2}{\omega_0^2}+1}{\frac{\omega^4}{\omega_0^4}-3\frac{\omega^2}{\omega_0^2}+1+j\frac{4\omega\alpha}{\omega_0}\left(1-\frac{\omega^2}{\omega_0^2}\right)} \quad (11)$$

This vector expression may be reduced to a scalar at an angle $\theta$ and becomes:

$$\frac{e_0}{e_1}=\sqrt{\frac{\frac{\omega^8}{\omega_0^8}-\frac{2\omega^6}{\omega_0^6}+\frac{3\omega^4}{\omega_0^4}-\frac{2\omega^2}{\omega_0^2}+1}{\frac{\omega^8}{\omega_0^8}+(16\alpha^2-6)\frac{\omega^6}{\omega_0^6}+(11-32\alpha^2)\frac{\omega^4}{\omega_0^4}+(16\alpha^2-6)\frac{\omega^2}{\omega_0^2}+1}}$$

at the angle $$\theta=\tan^{-1}\left[\frac{\frac{4\omega\alpha}{\omega_0}\left(\frac{\omega^2}{\omega_0^2}-1\right)}{\frac{\omega^4}{\omega_0^4}-3\frac{\omega^2}{\omega_0^2}+1}\right] \quad (12)$$

It is obvious that if the coefficients of the corresponding numerator and denominator powers of $$\frac{\omega}{\omega_0}$$

are equal, that, in Equation 12, the scalar value can be made to be unity and independent of $\omega$, i.e., the amplitude response will be uniform over an infinite frequency range.

Equating the coefficients of the $$\frac{\omega^6}{\omega_0^6}$$

terms, $$-2=16\alpha^2-6 \quad (13)$$

Equating the coefficients of the $$\frac{\omega^4}{\omega_0^4}$$

terms, $$3=11-32\alpha^2 \quad (14)$$

Equating the coefficients of the $$\frac{\omega^2}{\omega_0^2}$$

terms, $$-2=16\alpha^2-6 \quad (15)$$

Equations 13, 14, and 15 may be solved for $\alpha$ and in each instance, it is found that $$\alpha^2=1/4 \text{ or } \alpha=1/2 \quad (16)$$

Thus ½ is the theoretical value for $\alpha$ as defined in Equation 4. However, in practical circuits because of losses in the inductors and because of inadverent stray capacitances across the inductors, it may be that $\alpha$ may best be found experimentally but that it will usually be between the limits as given by Equation 5, that is, $\alpha$ will be greater than ⅓ but less than 1.0.

If the theoretical value of ½ is used for $\alpha$ in Equation 12, the magnitude of $$\frac{e_0}{e_1}$$

becomes 1 and the angle $$\theta=\tan^{-1}\left[\frac{\frac{2\omega}{\omega_0}\left(\frac{\omega^2}{\omega_0^2}-1\right)}{\frac{\omega^4}{\omega_0^4}-\frac{3\omega^2}{\omega_0^2}+1}\right] \quad (17)$$

the delay at $f=f_0$ has already been determined by Equation 3 as being $$\tau_1=\frac{1}{2f_0}$$

By the use of Equation 17 the time delays may be readily computed for other frequencies with these results:

| $\frac{f}{f_0}$ | $\theta$ | $\tau$ |
|---|---|---|
| 0 | 0 | $\frac{0.318}{f_0}$ |
| 0.615 | $\frac{\pi}{2}$ | $\frac{0.407}{f_0}$ |
| 1.00 | $\pi$ | $\frac{0.500}{f_0}$ |
| 1.62 | $\frac{3\pi}{2}$ | $\frac{0.463}{f_0}$ |

It will be noted that the time delay rises gradually to a peak at $$\frac{f}{f_0}=1$$

and then falls gradually. This is exactly what happens in a low pass filter between zero frequency and the cutoff frequency, so that the bridged-T network 10 provides a close match to the time delay characteristic of a typical low pass filter.

Referring now to FIGURE 2, there is shown a diagram of a portion of a stereophonic communication system of the type disclosed in the aforesaid patent application. A source of L+R and modulated L−R signals 20 are applied to an L−R detector 22, and the detected L−R signal is then applied to a low pass filter 24. The low pass filter 24 is provided to eliminate certain undesirable signals which may interfere with the proper reproduction of the detected signal. The output of the low pass filter 24 which introduces a time delay in the L−R signal is fed to a high impedance output resistor 26 having a tap 28 thereon. The source of signals 20 is also fed to the bridged-T network 10 as described in FIGURE 1. The bridged-T network 10 is connected to the upper end of the high impedance output resistor 26. The resistance 26 is several orders of magnitude higher than the source impedance 13 of the source 20. The output of the bridged-T network 10 is an L+R signal while the output of the low pass filter 24 is an L−R signal which are matrixed to provide an L output signal at the tap 28. The bridged-T network 10 is designed to provide the same time delay in the L+R signal that was introduced in the L−R signal by the low pass filter 24. Accordingly, when the signals are matrixed in the output impedance 26, no distortion will occur because of phase differences between the signals of the two channels.

The bridged-T network which has been described may be used for phase correction, the matching of time delays in two separate channels of a stereo communication system as shown in FIGURE 2 or for any other purpose where substantially uniform time delay is required only over a portion of a frequency band. At the same time the bridged-T network provides a ratio of output voltage to input voltage which remains constant over the band of frequencies which is desired to be passed, and the magnitude of the ratio is unity.

Since other modifications and changes varied to fit particular operating requirements and environments will be apparent to those skilled in the art, this invention is not considered limited to the examples chosen for purposes of disclosure and covers all changes and modifications which do not constitute departures from the true spirit and scope of this invention.

What I claim as new and desire to secure by Letters Patent in the United States is:

1. A bridged-T network having a first and a second input terminal and a first and a second output terminal, said second input and output terminals being connected to a point of common reference potential, a resistor, a resonant circuit comprising a first inductor connected across a first and a second capacitor which are serially connected, said resonant circuit being connected in series with said resistor between said first input and first output terminals, a second inductor connected between said first and second capacitors and said point of common reference potential, the parameters of the aforesaid components satisfying the equations as follows:

$$R=\alpha\sqrt{\frac{L}{C}} \text{ and } L_1=\frac{L}{4}$$

where

R is said resistor

L is said first inductor

C is ½ of said first or said second capacitor which are equal $L_1$ is said second inductor and $\frac{1}{3}<\alpha<1$.

2. In a stereo communication system having a signal comprising an L+R signal and a modulated L−R signal, an L−R detector, means coupling said signal to said detector for obtaining an L−R signal therefrom, a low pass filter, a high impedance load circuit, means for coupling said low pass filter between said detector and said load circuit to provide across said load circuit a delayed L−R signal, a bridged-T network including an inductor connected across a pair of series connected capacitors and another inductor connected between the junction of said capacitors and a point of common reference potential, means coupling said signal to said bridged-T network and said bridged-T network to said load circuit, the parameters of said bridged-T network being selected to provide a delay to the L+R signal of the magnitude as was introduced to the L−R signal by said low pass filter while the amplitude of the output voltage to the input voltage of said bridged-T network remains constant over the band of frequencies which are desired to be delivered to said load circuit.

3. A bridged-T network for use where substantially uniform delay is required over a lower portion of a frequency band and where the output voltage to input remains constant over such a frequency band comprising a resistor, a first inductor connected across a pair of serially connected capacitors, a second inductor connected between the junction of said capacitors and a point of reference potential, means connecting said resistor to one side of said first inductor, means for connecting a terminal to the other side of said first inductor, the component values of said resistor, said inductors and capacitors being chosen of such values that a signal applied thereto will be passed to said output with a substantially uniform delay for a lower portion of a frequency band and the ratio of output voltage to input voltage remains substantially constant over said frequency band.

No references cited.